(12) United States Patent
Feichtner et al.

(10) Patent No.: US 9,523,423 B2
(45) Date of Patent: Dec. 20, 2016

(54) TRANSFER GEAR HAVING REGULATED OIL FLOW

(71) Applicant: Magna Powertrain AG & Co KG, Lannach (AT)

(72) Inventors: Hans Thomas Feichtner, Graz (AT); Stefan Leitgeb, Kainbach bei Graz (AT); Markus Ringstein, Graz-Liebenau (AT)

(73) Assignee: Magna Powertrain AG & Co KG, Lannach (AT)

( * ) Notice: Subject to any disclaimer, the term of this patent is extended or adjusted under 35 U.S.C. 154(b) by 188 days.

(21) Appl. No.: 14/408,708

(22) PCT Filed: Jun. 24, 2013

(86) PCT No.: PCT/EP2013/063157
§ 371 (c)(1),
(2) Date: Dec. 17, 2014

(87) PCT Pub. No.: WO2014/001264
PCT Pub. Date: Jan. 3, 2014

(65) Prior Publication Data
US 2015/0152955 A1    Jun. 4, 2015

(30) Foreign Application Priority Data
Jun. 26, 2012   (DE) .......................... 10 2012 210 865

(51) Int. Cl.
*F16H 57/04*    (2010.01)
*F16H 57/05*    (2006.01)
*B60K 17/342*   (2006.01)

(52) U.S. Cl.
CPC ........ *F16H 57/0434* (2013.01); *F16H 57/045* (2013.01); *F16H 57/0427* (2013.01); *F16H 57/05* (2013.01); *B60K 17/342* (2013.01)

(58) Field of Classification Search
CPC ................ F16H 57/045; F16H 57/0434; Y10T 74/2186; Y10T 74/2189; B60K 17/344
(Continued)

(56) References Cited

U.S. PATENT DOCUMENTS 6,582,331 B1 *   6/2003   Baxter, Jr. ........... B60K 17/344
                                                    474/91
7,694,780 B2 *   4/2010              Beels van
                                Heemstede ......... F16H 57/0434
                                                    184/26

(Continued)

FOREIGN PATENT DOCUMENTS

DE    102008015200 A1    9/2009
JP     H01216166 A       8/1989
(Continued)

OTHER PUBLICATIONS

International Search Report dated Aug. 22, 2013.

*Primary Examiner* — Henry Liu
(74) *Attorney, Agent, or Firm* — Dickinson Wright PLLC

(57) ABSTRACT

The present invention relates to a transfer gear having an input shaft, a first output shaft, a second output shaft, and a torque transmission device which has a clutch in order to distribute a drive torque introduced via the input shaft selectively to the first output shaft and the second output shaft, wherein a drive acts between the torque transmission device and the second output shaft, and wherein an oil reservoir is provided for collecting the lubricating oil.

19 Claims, 4 Drawing Sheets

(58) Field of Classification Search
USPC .......................................... 474/91; 184/6.12
See application file for complete search history.

(56) References Cited

U.S. PATENT DOCUMENTS

| | | | |
|---|---|---|---|
| 7,743,888 B2 * | 6/2010 | Allen ................. | F16H 57/0434 180/223 |
| 7,753,173 B2 * | 7/2010 | Gratzer ............... | B60K 17/344 184/13.1 |
| 8,672,094 B2 * | 3/2014 | Quehenberger .... | F16H 57/0419 184/6.12 |
| 2005/0098386 A1 * | 5/2005 | Allen ................. | F16H 57/0434 184/6.12 |
| 2006/0131122 A1 * | 6/2006 | Burns ................ | F16D 25/123 192/70.12 |
| 2008/0026893 A1 * | 1/2008 | Yamamoto ............. | F16H 7/06 474/91 |
| 2008/0308354 A1 * | 12/2008 | Gratzer ............... | B60K 17/344 184/6.12 |
| 2012/0073905 A1 * | 3/2012 | Aida .................. | F16H 57/0408 184/6.12 |
| 2014/0116807 A1 * | 5/2014 | Paielli ................ | F16H 57/045 184/6.12 |
| 2014/0231174 A1 * | 8/2014 | Iwase ................. | B60K 6/405 184/6.12 |

FOREIGN PATENT DOCUMENTS

| | | |
|---|---|---|
| JP | H01148165 U | 10/1989 |
| JP | H01161822 U | 11/1989 |
| WO | 02090790 A1 | 11/2002 |
| WO | 2009156127 A1 | 12/2009 |
| WO | 2012038022 A1 | 3/2012 |

* cited by examiner

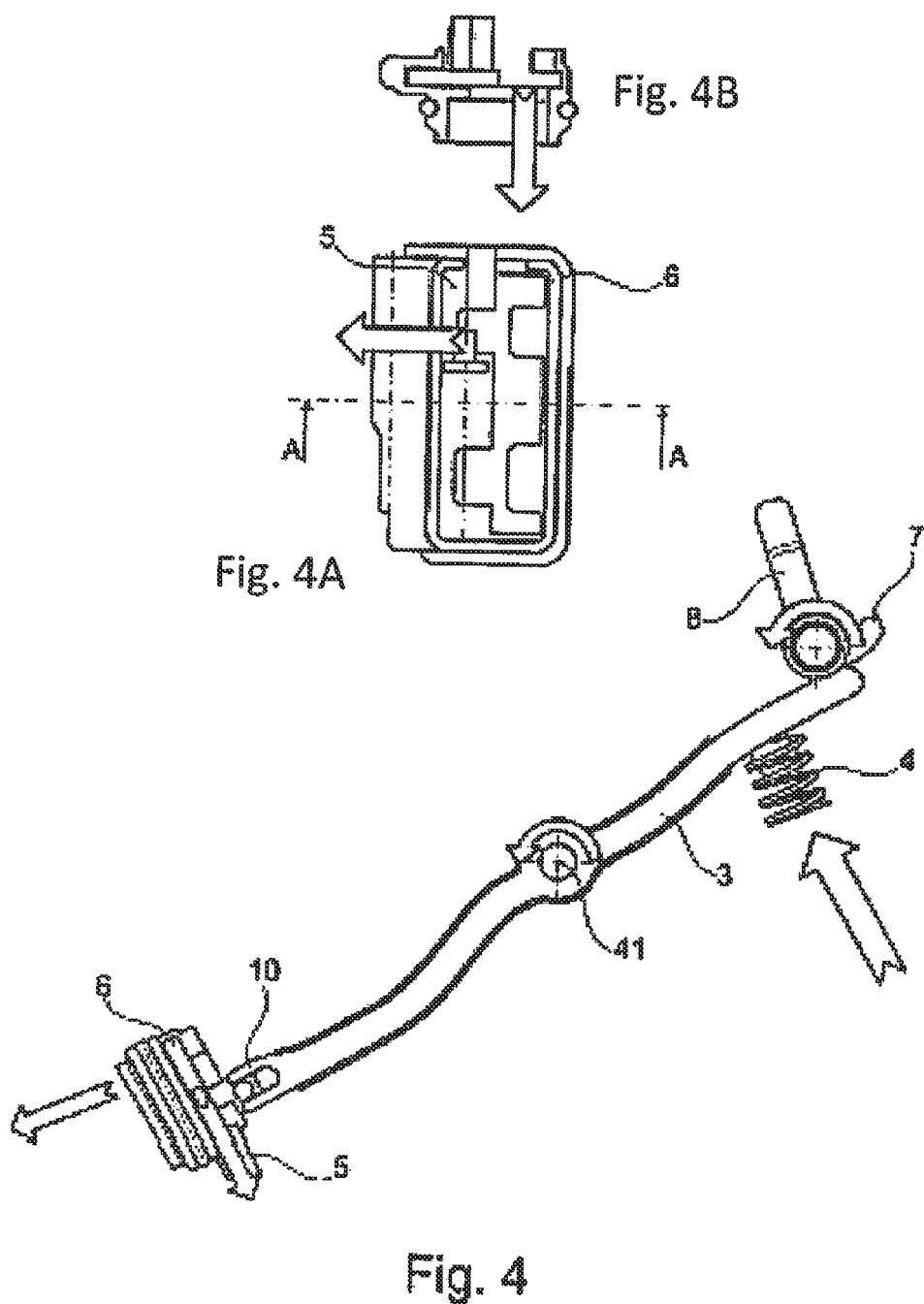

TRANSFER GEAR HAVING REGULATED OIL FLOW

CROSS-REFERENCE TO RELATED APPLICATIONS

This application is a National Stage of International Application No. PCT/EP2013/063157 filed Jun. 24, 2013 which claims the benefit and priority of German Application No. DE102012210865.3 filed Jun. 26, 2012. The entire disclosure of each of the above applications is incorporated herein by reference.

TECHNICAL FIELD

The invention starts from a transfer gear, having an input shaft, a first output shaft and a second output shaft, and having a torque transmission device, which has a clutch in order to distribute a drive torque introduced via the input shaft selectively to the first output shaft and the second output shaft, wherein a drive acts between the torque transmission device and the second output shaft, wherein an oil reservoir is provided for collecting the lubricating oil.

In particular, this is a transfer gear having a chain drive which has a lower chain wheel and an upper chain wheel, which are driven by means of a chain, wherein the lower chain wheel dips into an oil sump containing lubricating oil, wherein lubricating oil can be conveyed out of the oil sump in the direction of the upper chain wheel by means of the chain.

BACKGROUND

In a motor vehicle, transfer gears are used to distribute the drive torque in a variable manner to the two vehicle axles. For this purpose, the transfer gear has an input shaft, a first output shaft and a second output shaft. The input shaft is connected to a drive unit of the motor vehicle, e.g. an internal combustion engine. The first output shaft is connected to a first axle of the motor vehicle, e.g. the rear axle, in particular via a first axle differential. The second output shaft is connected to a second axle of the motor vehicle, e.g. the front axle, in particular via a second axle differential.

The transfer gear furthermore has a torque transmission device, which has a clutch in order to distribute a drive torque introduced via the input shaft selectively to the first output shaft and the second output shaft. For example, the first output shaft can be of one-piece design with the input shaft or can be connected thereto for conjoint rotation, wherein a friction clutch couples the input shaft selectively also to the second output shaft in a variable manner. As an alternative, it is possible, for example, for the torque transmission device to comprise an interaxle differential, wherein a friction clutch acts between the input shaft and one of the two output shafts (or between both output shafts) in order to lock the interaxle differential selectively in a variable manner.

The input shaft and the second output shaft are generally arranged at different heights, wherein an offset drive is provided between the torque transmission device and the second output shaft. Said offset drive can be designed as a chain drive, which has a lower chain wheel and an upper chain wheel, which are connected by means of a chain. The lower chain wheel is coupled for conjoint rotation to the second output shaft. The upper chain wheel is coupled for conjoint rotation to an output element of the torque transmission device.

To eliminate the need for the transfer gear to have a dedicated oil pump, the chain of the chain drive can serve as an oil delivery device. For this purpose, the lower chain wheel dips into an oil sump filled with lubricating oil, wherein lubricating oil is conveyed out of the oil sump in the direction of the upper chain wheel by means of the chain. At the upper end of the chain drive, the lubricating oil is thrown off the chain and can then be collected by a collecting device, for example, and passed from there in the direction of the lubrication points (e.g. friction clutch and bearings).

One disadvantage of known transfer gears is that the lower chain wheel, which dips into the oil sump, and the chain passed through the oil sump cause unwanted churning losses, i.e. drag torques arising in the oil sump reduce the efficiency of the transfer gear. Moreover, this increases the temperature of the lubricating oil in the oil sump, impairing the cooling effect of the lubricating oil.

WO 2012/038022 discloses a transfer gear which, in the oil reservoir, has an outlet opening which opens into the oil sump, wherein the chain is arranged on the outlet opening of the oil reservoir in such a way that the chain restricts the outflow of the lubricating oil collected in the oil reservoir into the oil sump.

In view of continuously increasing demands on the energy efficiency of motor vehicles, it is an object of the present invention to provide a transfer gear of the type described above which, while being of robust and reliable construction, exhibits less loss due to churning of the chain drive in oil.

The lower losses due to churning are advantageously achieved through a reduced oil level, which can be set by an actuable adjusting mechanism.

It is advantageous here if the actuable adjusting device is triggered by means of a torque transmission device, ensuring that the oil supply is initiated only when required.

DRAWINGS

The present invention is explained below purely by way of example by means of advantageous embodiments with reference to the attached drawings, in which:

FIGS. 4, 4A and 4B illustrate the operation of the first embodiment of the closure mechanism.

DESCRIPTION

Figure 1:
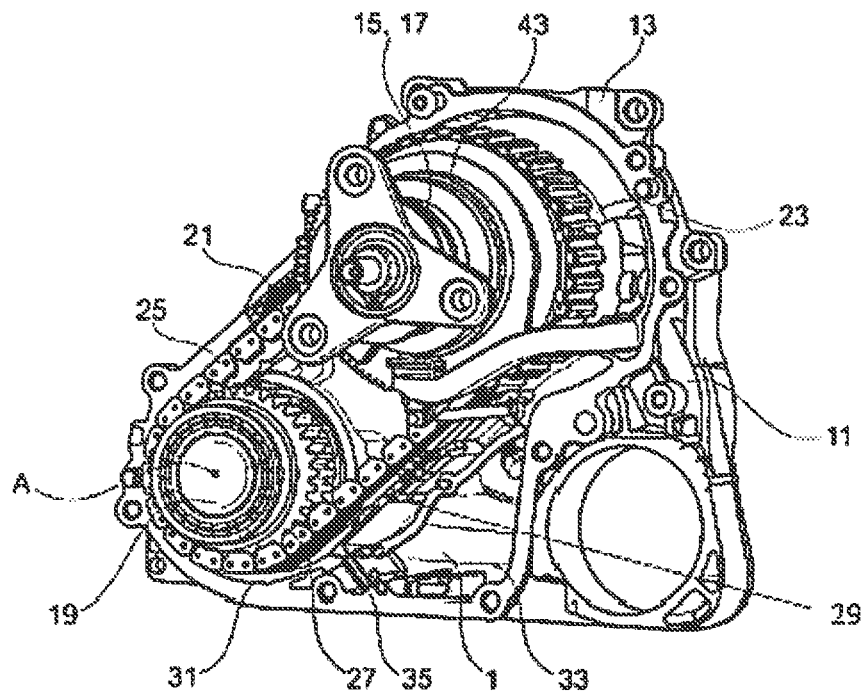
FIG. 1 illustrates a transfer gear with a closure mechanism.

The transfer gear illustrated in FIG. 1 has a two-part housing, of which only one half 11 is illustrated. Housing half 11 has a flange surface 13, on which an associated flange surface of the other housing half rests in the assembled state (not shown). An input shaft 15, which is of one-piece design with a first output shaft 17, is rotatably mounted in the housing by means of rolling bearings (not illustrated). A second output shaft 19 is furthermore rotatably mounted in the housing, being offset parallel to the input shaft 15, more specifically below the input shaft 15. The input shaft 15 is connected non-positively to a drive unit of a motor vehicle, e.g. to the output element of a main transmission associated with an internal combustion engine. The first output shaft 17 is connected non-positively to an axle differential of the rear axle of the motor vehicle, for example, while the second output shaft 19 is connected non-positively to an axle differential of the front axle of the motor vehicle. By means of a friction clutch (not illustrated) some of the drive torque introduced via the input shaft 15 can be transferred selectively in a known manner to the second output shaft 19 and thus to the front axle of the motor vehicle.

For this purpose, there is a chain drive 21 acting between the friction clutch and the second output shaft, wherein a first part of the friction clutch is connected for conjoint rotation to the input shaft 15 and a second part of the friction clutch is connected for conjoint rotation to an upper chain wheel 23 of the chain drive 21. The upper chain wheel 23 is connected to a lower chain wheel 27 by a chain 25. The lower chain wheel 27 is connected for conjoint rotation to the second output shaft 19.

The lower chain wheel 27 and that section of the chain 25 which rests on the lower chain wheel 27 dip into an oil sump 31, which is formed in the lowermost region of housing half 11 and is filled with some of the lubricating oil used to lubricate and/or cool components of the transfer gear, in particular for lubricating and cooling the fins of the friction clutch mentioned. During the operation of the transfer gear, the lubricating oil in the oil sump 31 can be taken along by the chain 25 along the chain guide 29 in the direction of the upper chain wheel 23. In the region of the upper chain wheel 23, the lubricating oil which is taken along can be thrown off or scraped off, for example, whereupon the lubricating oil is fed to the friction clutch mentioned and, if appropriate, to further lubrication points (e.g. bearings), via a suitable feeding device, e.g. via a channel.

An oil reservoir 33 is formed in the housing half 11 illustrated in addition to the oil sump 31. The oil reservoir 33 is used to collect the lubricating oil, most or all of which is passed into the oil reservoir 33 by means of a suitable return device (e.g. channel or conduit) after lubricating and cooling the friction clutch mentioned (and, if appropriate the bearings) in the intended manner. The oil reservoir 33 is arranged radially offset with respect to the oil sump 31 in relation to the axis of rotation A of the lower chain wheel 27.

Figure 2:
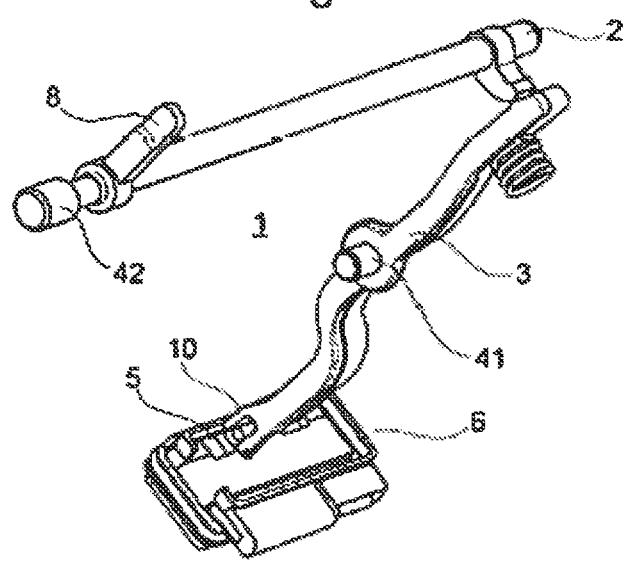
FIG. 2 illustrates a first embodiment of the closure mechanism.

A first embodiment of the closure mechanism 1 in accordance with the invention is illustrated in FIG. 2. Here, the adjusting mechanism comprises a selector camshaft 2, which is connected by means of a cam 7 to a selector rocker 3. The selector rocker 3, in turn, is connected to a selector plate 5. At both ends, the selector camshaft 2 has a bearing region 42, which is provided for securing the selector camshaft 2 in the housing 11 or in the upper housing part (not illustrated). A first lever 8 rests on the selector camshaft 2. The selector rocker 3 is rot ably mounted on a lever joint 41, which is mounted in the housing 11. At its end facing the cam 7, the selector rocker 3 is connected to a spring 4 and, at its end facing the selector plate 5, has a selector fork 10. The selector fork 10 surrounds a projection on the selector plate 5. The selector plate 5 is mounted movably in a seal 6.

Figure 3A:
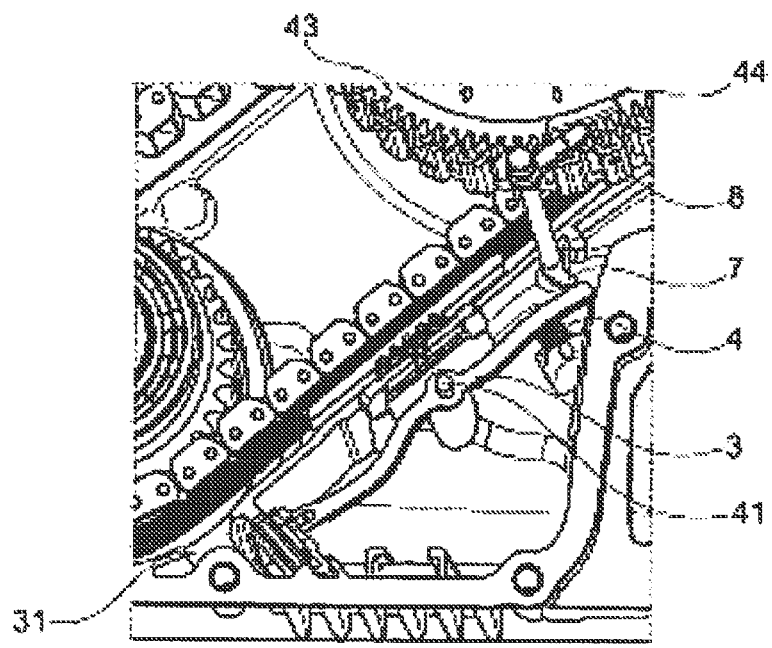
FIGS. 3A and 3B illustrate a closure mechanism in the closed and in the open state.
Figure 3B:
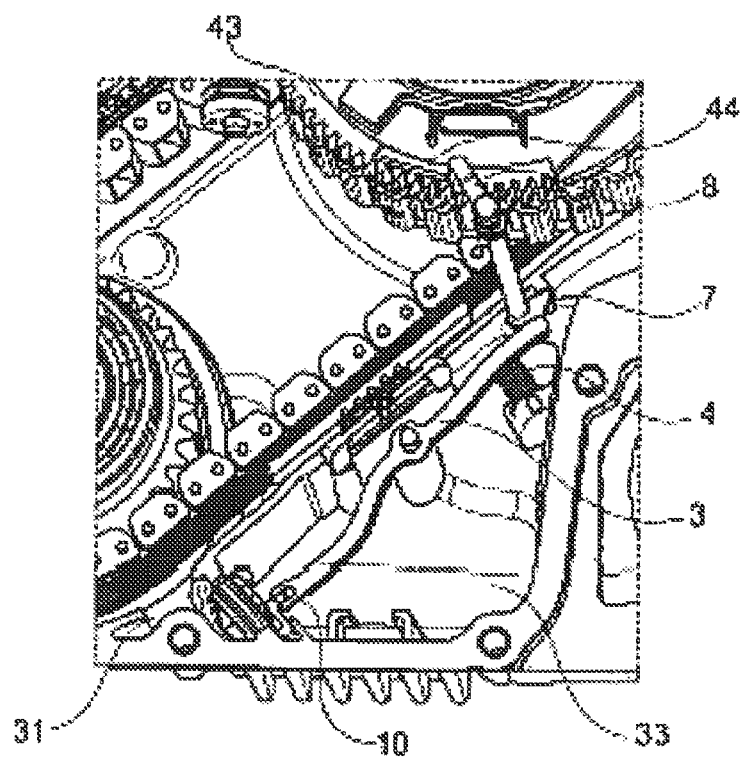

FIGS. 3A and 3B illustrate the use of the adjusting mechanism. FIG. 3A illustrates the state with the outlet to the oil sump 31 closed, and FIG. 3B illustrates it with the outlet opening open.

If an all-wheel clutch torque is required, depending on the driving situation, a multiplate clutch is pressed together by the actuating movement of the actuator ring, and a torque is transmitted to the secondary axle. The actuating movement of the actuator ring controls the closure mechanism 1, which closes the outlet opening 35 between the oil reservoir 33 and the oil sump 31. A servomotor drives a worm gear shaft, which causes an actuator ring 43 to rotate. The actuator ring 43 performs a translational motion in addition to the rotary motion. By means of this motion along the axis of the input shaft, it pushes a piston onto the multiplate clutch and establishes the required torque.

The outlet opening 35 is closed when no torque is being transmitted via the clutch to the second output shaft 19. This situation is illustrated in FIG. 3A. The selector camshaft 2 with its first lever 8 rests on a rib 44 of the actuator ring 43. The cam 7 is supported against the selector rocker 3 and thus exerts a load on the spring 4. The fork 10 of the selector rocker 3 engages in a projection on the selector plate 5 and, owing to the rocker position, moves it into the closed state.

FIG. 3B illustrates the situation during the opening of the closure mechanism. If a torque is set for the second output shaft 19 in the transfer gear, the first lever 8 of the camshaft 2 is released from the rib 44 of the actuator ring 43. The selector rocker 3 is rotated about the lever joint 41 by the rotary motion of the selector camshaft 2. During this process, the spring 4 presses with the spring force against the first end of the selector rocker 3. At the same time, the other end of the selector rocker 3 moves the selector plate 5 in the seal 6 in such a way that an opening is created between the oil chambers.

FIGS. 4, 4A and 4B illustrate the first embodiment and the movement during the triggering of the closure mechanism in detail.

Figure 5:
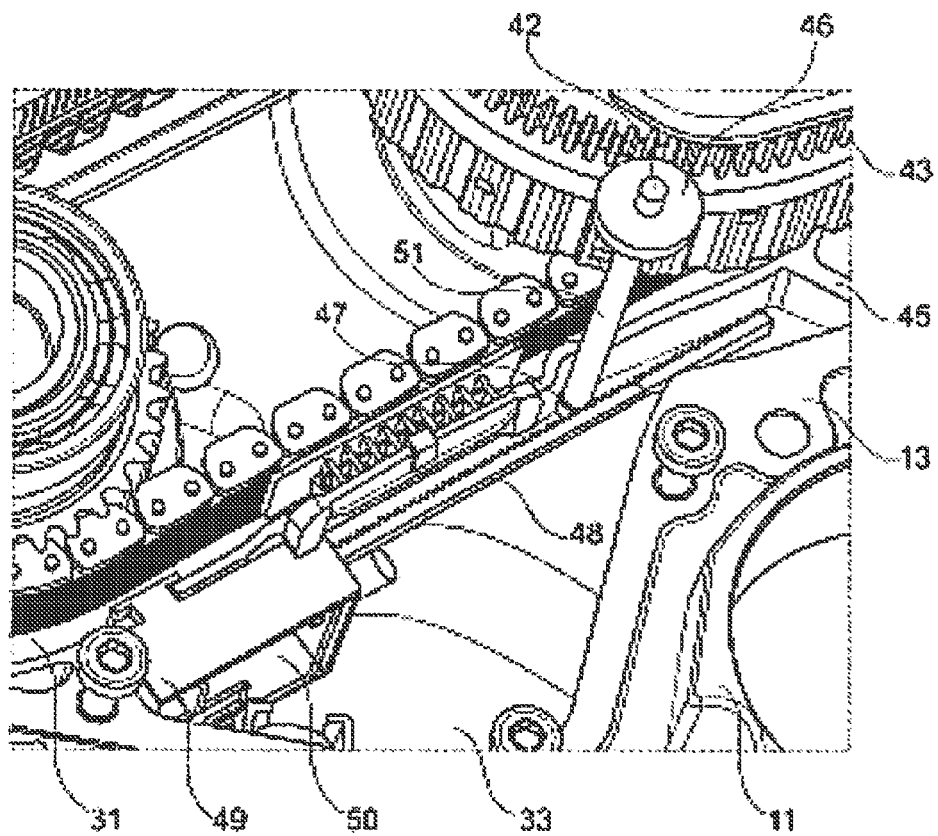
FIG. 5 illustrates a second embodiment of the closure mechanism.

FIG. 5 illustrates another advantageous embodiment of a closure mechanism. A shaft 51 is mounted in the housing 11 of the transfer gear by means of bearing region 42. The shaft 51 has a first set of teeth 46 and a second set of teeth 47. The first set of teeth 46 engages in the external teeth of an actuator ring 43. The second set of teeth 47 engages in the teeth of a rack 48. The rack 48 is connected to a slide 50 in a slide housing 49.

If the second output shaft 19 is selected by means of the clutch, the actuator ring 43 rotates and imparts a rotary motion to the shaft 51 via its external teeth and the first set of teeth 46. The rack 48 is driven by means of the second set of teeth 47 of the shaft 51, leading to a linear motion. The rack 48 opens the slide 50 in order in this way to connect the two oil chambers to one another.

The embodiments illustrate transfer gears with a chain drive, but other transfer gears with wheels, chains and combinations thereof can also be used to carry out the invention.

LIST OF REFERENCE SIGNS

| | |
|---|---|
| 1 closure mechanism | A axis of rotation of the lower chain wheel |
| 2 selector camshaft | 40 fastening point |
| 3 selector rocker | 41 lever joint |
| 4 spring | 42 bearing region |
| 5 selector plate | 43 actuator ring |
| 6 seal | 44 rib |
| 7 cam | 45 rack |
| 8 first lever | 46 first set of teeth |
| 10 fork | 47 second set of teeth |
| 11 housing half | 48 rack |
| 13 flange surface | 49 slide housing |
| 15 input shaft | 50 slide |
| 17 first output shaft | 51 shaft |
| 19 second output shaft | |
| 21 chain drive | |
| 23 upper chain wheel | |
| 25 chain | |
| 27 lower chain wheel | |
| 29 chain guide | |
| 31 oil sump | |

-continued

LIST OF REFERENCE SIGNS 33 oil reservoir
35 outlet opening

What is claimed is:

1. A transfer gear comprising an input shaft, a first output shaft, a second output shaft, and a torque transmission device which has a clutch operable to distribute a drive torque introduced via the input shaft selectively to the first output shaft and the second output shaft, wherein a drive acts between the torque transmission device and the second output shaft, wherein an oil reservoir is provided for collecting the lubricating oil, and wherein the oil reservoir has an outlet opening which opens into the oil sump and the outlet opening can be controlled by means of an adjusting mechanism that can be actuated by the clutch.

2. The transfer gear in accordance with claim 1, wherein a chain drive acts between the torque transmission device and the second output shaft, said chain drive having a lower chain wheel and an upper chain wheel which are connected in terms of drive by means of a chain, wherein the lower chain wheel dips into an oil sump containing lubricating oil, and wherein lubricating oil can be conveyed out of the oil sump in the direction of the upper chain wheel by means of the chain.

3. The transfer gear in accordance with claim 1, wherein the adjusting mechanism is triggered mechanically by means of the torque transmission device.

4. The transfer gear in accordance with claim 1, wherein the adjusting mechanism is connected to the torque transmission device by means of a component which has at least one shaft and one connection element.

5. The transfer gear in accordance with claim 4, wherein the connection element is a lever and the shaft has a cam.

6. The transfer gear in accordance with claim 5, wherein the cam acts on a selector rocker.

7. The transfer gear in accordance with claim 6, wherein the selector rocker is under a preload.

8. The transfer gear in accordance with claim 6, wherein the selector rocker acts on a selector plate.

9. The transfer gear in accordance with claim 4, wherein the connection element has a first set of teeth and the shaft has a second set of teeth.

10. The transfer gear in accordance with claim 9, wherein the shaft engages by means of the second set of teeth in a rack.

11. The transfer gear in accordance with claim 10, wherein the rack moves a slide.

12. A transfer gear for use in a motor vehicle having a drive unit and front and rear axle assemblies, the transfer gear comprising:
a housing defining an oil reservoir filled with a lubricating oil and an oil sump in fluid communication with said oil reservoir via an outlet opening;
a first shaft rotatably supported by said housing and which is adapted to transmit drive torque from the drive unit to the rear axle assembly;
a second shaft adapted to be drivingly interconnected to the front axle assembly;
a torque transmission device operable for selectively transmitting drive torque from said first shaft to said second shaft, said torque transmission device including an offset drive that is drivingly connected to said second shaft and a clutch operable for selectively connecting said offset drive to said first shaft; and
a closure mechanism operable for controlling flow of lubricating oil from said oil reservoir into said oil sump in response to actuation of said clutch.

13. The transfer gear of claim 12 wherein said offset drive includes a first chain wheel rotatably supported on said first shaft, a second chain wheel fixed for rotation with said second shaft, and a chain drivingly interconnecting said first chain wheel and said second chain wheel, wherein said second chain wheel dips into said oil sump such that lubricating oil is conveyed out of said oil sump in a direction of said first chain wheel by said chain, and wherein lubricating oil thrown off of said chain and said first chain wheel is returned to said oil reservoir.

14. The transfer gear of claim 12 wherein said torque transmission device further includes an actuator unit for selectively shifting said clutch between a released non-torque transmitting mode and an engaged torque transmitting mode, said actuator unit having a moveable actuator member located in a first position when said clutch is operating in its release mode and located in a second position when said clutch is operating in its engaged mode, and wherein said closure mechanism is controlled in response to movement of said actuator member such that said outlet opening is closed when said actuator member is in its first position and is opened when said actuator member is in its second position.

15. The transfer gear of claim 14 wherein said closure mechanism includes a moveable plate operable in a first position to close said outlet opening and in a second position to open said outlet opening, and an adjusting mechanism configured to locate said plate in its first position when said actuator member is located in its first position and to locate said plate in its second position when said actuator member is located in its second position.

16. The transfer gear of claim 15 wherein said adjusting mechanism includes a selector rocker pivotably mounted to said housing, a camshaft rotatably mounted to said housing, a cam fixed to said camshaft, a lever fixed to said camshaft, and a biasing spring, wherein said lever engages said actuator member of said actuator unit, wherein said can engages a first end of said selector rocker, wherein said plate is coupled to a second end of said selector rocker, wherein said biasing spring is configured to apply a biasing force to said selector rocker, wherein location of said actuator member in its first position causes said lever to rotate said camshaft and cause said cam to forcibly pivot said selector rocker in opposition to said biasing force into a first pivot position for locating said plate in its first position, and wherein location of said actuator member in its second position permits said biasing spring to urge said selector rocker into a second pivot position for locating said plate in its second position.

17. The transfer gear of claim 16 wherein said biasing spring is disposed between said housing and said first end of said selector rocker.

18. The transfer gear of claim 15 wherein said adjusting mechanism includes a shaft rotatably mounted in said housing, a rack fixed to said plate and having rack teeth, a first gear fixed to said shaft and in meshed engagement with gear teeth formed on said actuator member, and a second gear fixed to said shaft and in meshed engagement with said rack teeth, said actuator member being rotatable between its first and second position such that rotation of said actuator member to its first position causes said shaft to rotate in a first direction for linearly translating said rack to locate said plate in its first position, and rotation of said actuator member to its second position causes said shaft to rotate in a second direction for linearly translating said rack to locate said plato in its second position.

19. The transfer gear of claim 12 wherein said oil reservoir is offset and elevated relative to said oil sump, wherein said outlet opening is formed by a portion of said housing, wherein said closure mechanism is mounted in said outlet opening and includes a slideable member located in a first position to prevent said oil to flow from oil reservoir into said oil sump, and wherein said closure mechanism includes an adjusting mechanism operable to locate said slideable member in its first position when said actuator member is in its first position and to locate said slideable member in its second position when said actuator member is in its second position.

* * * * *